May 23, 1961 L. J. GOLDBECK 2,985,540
MANUFACTURE OF CELLULOSIC PRODUCT
Filed May 19, 1958
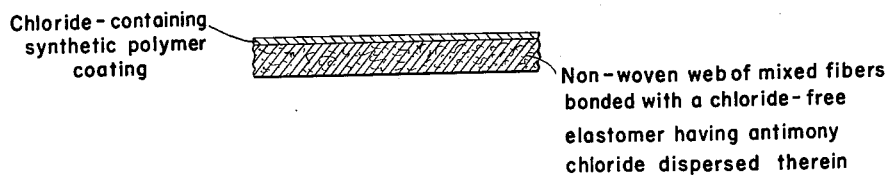

United States Patent Office 2,985,540
Patented May 23, 1961

2,985,540

MANUFACTURE OF CELLULOSIC PRODUCT

Leroy J. Goldbeck, Neenah, Wis., assignor to Kimberly-Clark Corporation, Neenah, Wis., a corporation of Delaware Filed May 19, 1958, Ser. No. 735,930

5 Claims. (Cl. 117—76)

The present invention is concerned with a method of manufacturing cellulosic products and in particular with a method of manufacturing a fire-resistant, saturated and coated fibrous product.

Fibrous paper sheets having exceptional strength and wear resistance have been made by employing blends of cellulose fibers and one or more of the synthetic resin polymer fibers in a modified papermaking operation. The term "synthetic resin polymer fiber" is used to include man-made fibers of synthetic resinous materials such as: polyacrylonitrile fibers, for example "Orlon," and "Acrilan"; copolymers of polyvinylidene chloride and polyvinyl chloride, such as "Saran"; polyethylene terephthalate fibers such as "Dacron"; nylon fibers; polyurethane fibers; and other similar synthetic fibers. Sheets composed of such blends of fibers can be formed in the conventional manner of making papers but the inter-fiber bonding of the resultant sheet is very low so that such sheets are normally saturated with a saturant which binds the fibers of the sheet together. Various saturants have been used for saturating fibrous webs, such as unsaturated rubber latices and solutions thereof and various rubberlike plastics having molecular cohesion values of the order of 1000 to 2000 calories per mole. Perhaps the chief function of the saturant is to impart strength to the paper sheet. This may be accomplished by physical adhesion of the saturant to the fibers but is preferably accomplished by chemical bonding of the saturant with the fibers. In a blended fiber sheet of synthetic resin polymer fibers and cellulose fibers, saturants which might be suitable for a sheet formed of a single variety of fibers may not be suitable because of lack of adhesion to one or the other variety of fibers in the sheet. Other desirable characteristics of the saturated sheet are high folding endurance, high flexibility, high internal tear, high edge tear, delamination resistance, high wet strength properties, and resistance to physical degradation and discoloration due to heat and light aging. In addition to its chief purpose as a fiber bonding agent the saturant may also be employed as a carrier for various inert materials such as pigments, mineral fillers, etc.

Saturated fiber sheets may have certain properties further improved by coating the sheets. In general coatings applied to paper sheets are aqueous suspensions of synthetic resins. These suspensions may also be carriers of finely divided mineral matter such as clay, pigments, finely divided metals, color lakes and the like applied to the paper to improve the appearance, the printing qualities, or other properties of the paper. The mineral coating covers the individual fibers of the paper's surface and fills the interstices between fibers thus rendering the surface of the paper more level and more uniform in texture. In addition, it binds the mineral content of the coating to the paper so that it will not be removed by printing if the paper is printed, and the paper will have a tougher, more resilient finish. Pigmented aqueous dispersions of synthetic resin polymers are often used as coatings. These may include the acrylates, acrylates polymerized with acrylonitrile or methacrylates, vinyl chlorides, vinylidene chlorides and other polyvinyl halides and similar plastics.

Saturated coated webs of blends of synthetic resin and cellulose fibers may have end uses, in which it would be highly desirable for the web to have fire-resistant characteristics. Now, while methods have been developed for imparting fire-resistance to conventional papers and textiles, made solely of cellulose fibers, or made solely of synthetic fibers, the problems involved in making saturated, coated webs of blends of fibers fire-resistant are somewhat different. There are four major components of the web to be considered in the fire-proofing operation. These are the cellulose fibers, the synthetic resin polymer fibers, the saturant and the coating. It has been found that fire-proofing agents for cellulosic materials such as ammonium phosphates, and ammonium sulfates may be unsuitable for resins and vice versa. In fact, certain flame-proofing treatments suitable for cellulosic fiber webs have accelerated the propagation of flame in synthetic fiber webs. This may be attributed in part to the fact that the combustion of synthetic fibers and resins is characteristically different than that of cellulose. The synthetic resins apparently melt and drop into the flame area and may strongly contribute to the flame, whereas cellulose is apparently destructively distilled by the heat and gives off an inflammable gas and the cellulose residue apparently burns in place. The fire-retardant agent must thus be one which is applicable to both resins and to cellulose. In addition, it must not have a deleterious effect upon the components of the product. For example, it was found that certain flame-retardant agents, when incorporated in typical saturants, so lower the strength of the saturant that the strength of the saturated web is seriously decreased.

It is the object of the present invention to provide fire-resistant, saturated, coated, synthetic composition webs of blends of synthetic resin polymer fibers and cellulose fibers, and methods of making such webs.

Other objects will be apparent from the description of the invention which follows.

The accompanying drawing shows diagrammatically and on an enlarged scale one embodiment of a product made according to the invention.

It has been found in accordance with the present invention that a fire resistant, saturated, coated web of a blend of synthetic resin polymer fibers and cellulose fibers can be produced by impregnating a web of a blend of cellulose fibers and synthetic resin polymer fibers with a saturant mixture comprising a chloride-free elastomer and antimony trioxide and then coating the impregnated web with a chloride containing polymer. The resultant web is highly flame resistant and yet has high edge and internal tear strength and good dimensional stability. Such webs may suitably be used for tarpaulins, tents, maps, window shades, movie screens, automotive trim materials and other such end uses.

The web of the present invention is made up of a blend of cellulose fibers and of one or more of the synthetic resin polymer fibers. The cellulose fibers are preferably long fibered, strong fibers such as the cellulose fibers produced by the kraft process, but other conventional cellulose fibers such as those produced by the sulfite process may be used. Other cellulosic fibers such as the fibers produced by the pulping of hemp, manila, flax and sisal, may also be employed, either separately or in combination.

The synthetic polymers employed in the blend may be those which have been conventionally employed in the manufacture of synthetic resin-cellulose papers such as "Orlon," "Acrilan," "Saran," "Dacron," nylon, polyurethane, and other similar synthetic fibers. Webs made of fiber contents of between 10 and 80 percent cellulose and preferably between about 40 and 70 percent cellulose may be employed.

Methods of forming blends of cellulose fibers and synthetic resin polymer fibers into webs on paper forming machines have been developed and are generally known. Webs may also be formed by various air-forming operations. These conventional methods may be employed to form the present web. The sheet should be formed under conditions such that it has a uniform formation. In general, the web is formed in the same manner as conventional cellulosic webs are water formed into paper. The cohesiveness of the web resulting from the surface tension of the wet web is substantially lost, however as the web dries, because the interfiber bonding due to the surface tension of the moisture in the web is not replaced to any great extent by the interfiber bonding between the cellulose fibers as it is in conventional paper. It is therefore necessary to use other methods of binding the fibers together in a coherent web as the web is dried. This is usually accomplished by saturating the web with a resin latex. If the web has a relatively high cellulosic content the web may be bonded together with conventional sizes, wet strength resins, and other relatively less adherent bonding agents. However, if the web has a low cellulosic content it may be desirable to saturate the web with a higher strength elastomeric resin polymer. This may be accomplished by saturating the damp web with the saturant of the present invention.

An alternative method of imparting handling strength to the dried web is to mix with the fibers of which the web is formed a small proportion of thermoplastic fibers having a relatively lower melting point than the fibers of which the bulk of the web is made. Heat is then applied to the web while it is moist and adequately supported for example by the forming wire in an amount sufficient to soften the thermoplastic fibers and thus mat the web together.

The strength of a web formed of a blend of cellulose and synthetic resin polymer fibers depends to a considerable extent upon the strength of the resin with which it is impregnated. Where the use of the finished sheet depends upon its having considerable strength it is essential that an elastomer be employed as saturant which will impart the maximum strength to the saturated web. It is also necessary that any additives added to the web to impart additional characteristics, for example, as in the present case to make the web fire resistant, do not detract from the strength of the saturated web. It was found in accordance with the process of the present invention that antimony trioxide could be mixed with chloride-free elastomers such as the butadiene styrene type, the butadiene acrylonitrile type, and particularly the polyacrylic ester elastomers without affecting the strength of a web saturated with these mixtures. Mixtures of antimony trioxide and chloride-containing elastomers such as the vinyl chloride type, and the vinylidene chloride type were however found to impart relatively lesser strength to the web and the resultant webs were too weak to be used for most purposes. On the other hand, a chloride salt such as ammonium chloride could be incorporated in the saturant without loss of strength, but webs prepared in this way had unsatisfactory fire resistance. It was found, however, that the chloride component which is essential to the maximum effectiveness of antimony trioxide as a fire retardant agent could be incorporated in the web by using a chloride-containing resin such as a vinyl chloride resin as the coating.

Webs prepared in such manner with the antimony oxide component of the fire retardant in the saturant and the chloride component in the coating can be made to have a high degree of fire resistance, for example, that required to meet the ASTM Standard D626–55T, "Fire Retardant Properties of Treated Textile Fabrics," yet without any loss of strength over a similar web containing no fire retardant.

The resins preferably employed in the saturants are latices containing elastomeric polymers of acrylate esters. These resins are chloride-free and normally contain a copolymer formed of at least one polymerizable alpha-beta unsaturated carboxylic acid in which the unsaturation is a double bond or ethylenic linkage, and at least one alkyl acrylate in which the alkyl group contains from one to four carbon atoms.

Examples of polymerizable mono-unsaturated alpha-beta ethylenic carboxylic acids include: acrylic acid, methacrylic acid, itaconic acid, aconitic acid, maleic acid, fumaric acid, and the like. Examples of alkyl acrylates include the esters of primary alkanols, such as methyl acrylate, ethyl acrylate, propyl acrylate and butyl acrylate; and esters of secondary alkanols, such as iso-propyl acrylate and iso-butyl acrylate. These copolymers are of a softness such that hardening comonomers may be introduced. Examples of such hardening comonomers include the alkyl methacrylates in which the alkyl group may have from one to four carbon atoms, for example, the methyl, ethyl, propyl, iso-propyl, butyl, and iso-butyl methacrylates.

The proportions of the monomers used to produce the copolymer, for example, may be from about 0.5 to about 7 percent by weight of a carboxylic acid compound, at least 80 percent by weight of an alkyl acrylate, and from 0 percent to 19.5 percent of an alkyl methacrylate.

The following list gives several typical copolymer systems in which the percentages are by weight:

Ethyl acrylate 84.5 percent, methyl methacrylate 10.5 percent, itaconic acid 5.0 percent.
Ethyl acrylate 85 percent, methyl methacrylate 10 percent, acrylic acid 5.0 percent.
Ethyl acrylate 95 percent, acrylic acid 5 percent.
Ethyl acrylate 95 percent, methacrylic acid 5 percent.

Techniques for polymerizing the foregoing monomers into the copolymer are further illustrated in U.S. Patents Nos. 2,795,564; 2,760,886; 2,790,736; and 2,790,735.

$T_i$ values of the polymer from 0° C. to −45° C., are preferred. The $T_i$ value is a transition temperature or inflection temperature found by plotting the modulus of rigidity against temperature. A convenient method for determining rigidity and transition temperature is described by I. Williamson, "British Plastics," 23, 87–90, 102 (September, 1950), and this value is often referred to as the "Williamson $T_i$ value." The $T_i$ value here used is that determined at 300 kilograms per square centimeter.

Other chloride-free elastomers which may be employed in the saturant composition include the butadiene rubbers which have been commercially prepared as latices. The butadiene-acrylonitrile copolymers have a high modulus and lack of tack in the uncured state, good adhesion to the fiber web and are compatible with the vinyl resins usually employed as coatings. There are many different commercial resins which may be employed in the saturant composition of the present invention. Typical commerical resins of the butadiene-acrylonitrile type which are suitable include "Butaprene NL," "Chemigum 245," "Hycar 1562," "Nitrex 2612," and "Polycol 422."

Butadiene-styrene, rubber latices may also be employed as the resin component of the saturant. The butadiene-styrene rubbers of intermediate styrene content are preferred, such as GR–S type III, type IV and type VI. There are many commercial modifications which are suitable.

The saturant mixture is normally prepared by mixing an aqueous suspension of the resinous copolymer with an aqueous dispersion of antimony oxide and such other additives as may be employed in the saturant. Commercial preparations of synthetic resinous copolymeric elastomers are usually employed. These may contain between about 35 and 65 percent solids and normally contain about 45 to 60 percent solids. To this is added the aqueous suspension of antimony trioxide which normally contains between about 25 and 50 percent solids. The amount of antimony oxide in the saturant composition should be at least about 15 percent of the weight of the elastomer based upon dry weight. Other solids may also be added for various reasons, for example, carbon black and salts of heavy metals such as calcium, zinc, barium, and magnesium oxides. These solids are usually added in the form of aqueous dispersions. These solids may be used to impart opaqueness to the material, to improve the solvent resistance, improve the heat and light stability, improve dry tensile strength, and increase the rate of wet strength development by heat aging.

The web may be saturated by dipping the web in the solution and then running through squeeze rolls; by spraying a saturant on the web or by any other conventional method of saturating fiber webs. The web is normally saturated with about 30–200 parts of saturant composition on a solids basis per 100 parts of fiber. The strength of the saturated web may also be improved by curing the resin saturated web under controlled conditions of temperature and humidity such as are usually employed for curing the elastomer with which the web is impregnated. The resultant saturated web, while useful as an intermediate in the production of a strong fire-resistant coated web may also be used in the same manner as conventional saturated webs.

As previously pointed out, the coating which is applied to the saturated web in the process of the present invention serves two purposes, (a) to provide chloride ion which reacts with the antimony oxide component of the saturant to provide the fire-resistance of the finished product, and (b) to impart the characteristics to the saturated web for which coatings are normally employed, i.e., improve abrasion-resistance, appearance, printing qualities, etc. In order that the coating may serve function (a) above, it is essential that it have a substantial chloride content. Thus the chloride content of the coating, based upon the solids content, should be at least about 8 percent by weight and at least about 10 lbs. of coating per ream of 3000 square feet of web, and the coating should be applied to each side of the saturated web. The chloride may be part of the resin, of the plasticizer, or other additives to the resin, or a volatile salt content. Since many conventional coating resins have very substantial chloride contents, it is preferred that such a resin having a high chloride content be employed. In particular, the vinyl chloride and vinylidene chloride resins are conventional coating resins which do have high chloride contents of the order of 50 percent or greater. If these resins are employed as the resin constituent of the coating it is therefore usually unnecessary to increase the chloride content of the coating by any other additives. Representative resins which may be used are the commercially available vinyl chloride latices such as "Geon 151," the pre-plasticized vinyl chloride resins such as "Geon 576" and the copolymers which are predominately vinyl chloride and have a lesser content of other polymeric resins such as the acrylates and the methacrylates. The vinylidene chloride resins such as "Geon 653" and "Saran latex F122–A20" may also be employed. The vinylidene chloride resin base plastics have a substantially higher content of chloride than the vinyl chloride resins and so are especially suitable where the resins are required to carry a high percentage of an inert material. The web should be coated on both sides to impart the maximum fire resistance to the coated web. Both the vinyl chloride and the vinylidene chloride type resins may be employed to carry various additives which improve the surface characteristics of the web, for example, clay dispersions, titanium oxide dispersions, and various metal oxides, dyes, etc. The coating may be applied to the web as a single coating or as several separate coatings as in conventional coating practice. Conventional methods of coating may be employed such as knife coating, reverse roll coating, dip coatings, spray coatings, etc.

While latices are preferred for the resin component of the saturant and the coating it should be appreciated that resins in other forms such as organosols and plastisols may be employed.

Now that the process has been generally described, it may be further illustrated by the following specific examples.

*Example I*

It was desired to make a strong opaque web which would have a smooth, white surface suitable for calendering and which would have the fire resistance specified in the American Society for Testing Materials ASTM Standard D626–35T. This test is described in the ASTM Standards 1955 edition, Part 7, page 207. A web of 40 percent cellulose fibers in the form of a bleached kraft pulp (Cellate), 20 percent manila fiber and 40 percent "Dacron" fibers was prepared by water forming. The web had a basis weight of 30 pounds per 3000 square feet. The web was then dipped in a saturant bath of the following composition:

| Saturant | Parts by Weight | |
|---|---|---|
| | Dry | Wet |
| Polyacrylic ester rubber | 417 | 908 |
| Clay | 87 | 158 |
| Titanium oxide (TiO$_2$) | .34 | 62 |
| Antimony oxide (Sb$_2$O$_3$) | 115 | 314 |
| Carbon black | 3.5 | 9.44 |
| Water | | 148 |

The "dry" weight indicates the wt. of solids in the component and the "wet" weight indicates the amount by weight of the aqueous dispersion of the component added to the mixture.

The polyacrylic ester rubber employed was a water dispersion containing 260 parts ethyl acrylate, 155 parts methyl methacrylate, and 6½ parts methacrylic acid (100 percent), plasticized with 25 parts of diamylphenoxypolyethoxyethanol and prepared in accordance with the method described in Example 6 of U.S. Patent No. 2,795,564. Following dipping, the web was passed through a squeeze roll and then calendered at 180° F. The calendering effects at least a partial cure of the saturant resin. Approximately 140 parts of dry binder was deposited per 100 parts of dry fiber. The clay and titanium oxides of the saturant mixture were inert fillers and the carbon black was an opaquing material.

After calendering the web was then coated with two coats of coating material by means of a rod coater. Formulation of the two coats are as follows:

| First Coating | Parts by Weight | |
|---|---|---|
| | Dry | Wet |
| Ester plasticized vinyl chloride resin latex (Geon 576) | 200 | 364 |
| Titanium Oxide (TiO$_2$) | 150 | 273 |
| Clay | 150 | 273 |

| Second Coating | Parts by Weight | |
|---|---|---|
| | Dry | Wet |
| Ester plasticized vinyl chloride resin latex (Geon 576) | 100 | 179 |
| Unplasticized vinyl chloride resin latex (Geon 351) | 25 | 45 |
| Clay | 37.5 | 68 |
| Titanium oxide dispersion | 62.5 | 114 |
| Magnesium carbonate dispersion | 12.5 | 62.5 |

The unplasticized vinyl chloride resin is one substantially consisting of 80 percent of vinylchloride and 20 percent of an acrylate. The ester plasticized resin consists essentially of about 100 parts of the unplasticized resin (Geon 351) and 35 parts of a plasticizer, dioctylphthalate, and was prepared substantially as described in U.S. Patent 2,431,745. The web was dried in an oven after each coat at a temperature of about 200° F. The titania and clay dispersions were inert fillers in the resins to improve the surface characteristics of the web and to impart whiteness to the finished product.

The product which was 0.091 inch thick and had a bursting strength of 38.9 pounds per square inch was tested for strength in accordance with TAPPI (Technical Association of Pulp and Paper Industry) Standard T-404. The averages of tensile strength in both directions was 15 pounds per inch of width. The product was also tested for tongue tear by a modification of the ASTM test No. S-39-C in which a 2 x 2¼" sample having a longitudinal tear one inch long is placed in an Instron tester and tensile stress applied to the tongues at a rate of 10 pounds per minute. The tear by this method was found to be 416 grams. The saturated coated web was then tested for fire resistance in accordance with ASTM Standard D626-55T and was found to be acceptable under this standard with respect to the three characteristics of "flame out," "after glow," and "charring."

*Example II*

A saturated, coated web was prepared by a procedure similar in all respects to that of Example I, except that the web was saturated with a saturant having the following composition:

| Saturant | Parts by Weight | |
|---|---|---|
| | Wet | Wet |
| Butadiene-Acrylic copolymer rubber | 417 | 1,043 |
| Clay | 150 | 273 |
| TiO₂ | 58 | 106 |
| Sb₂O₃ | 115 | 314 |
| Carbon black | 3.5 | 9.44 |

The web was saturated with 99 parts of saturant per 100 parts of fiber, both by dry weight. The butadiene-acrylic copolymer rubber was a mixture of 313 parts by dry weight of Hycar 1577 and 104.5 parts by dry weight of Hycar 1561. Hycar 1577 is a medium acrylonitrile content latex having a pH of 9.5, a total solids content of 40 percent and a viscosity (Brookfield LVF, #1 spindle, 60 r.p.m.) of 36 centipoises. The Hycar 1561 is a high acrylonitrile content latex having a pH of 9.5, a total solids content of 40 percent and a viscosity of 70 centipoises (measured as above).

The resultant coated, saturated, web which was 0.074 inch thick had a bursting strength of 38.1 pounds per square inch, and an average tensile strength in both directions of 17.9 pounds per inch of width. The average of tongue tear tests in both directions was 480.5 grams. The fire resistance determined in accordance with ASTM Standard D626-55T was satisfactory.

It will be apparent from the foregoing description and example that the process of the present invention may be conveniently employed to produce a fire resistant web of blended cellulose and synthetic fibers. Numerous modifications can be made without departing from the scope of the present invention which is to be limited only by the claims which follow.

What is claimed is:

1. The method of preparing a fire-resistant non-woven web which comprises impregnating a fibrous non-woven web structure consisting of a blend of about 10-80% cellulosic fibers and about 90-20% synthetic non-cellulosic fibers with an aqueous suspension comprising a mixture of an elastomeric chloride-free polymer latex and a dispersion of antimony trioxide, the antimony trioxide solids amounting to at least about 15% of the dry weight of the elastomeric polymer, substantially curing the impregnated web, and then coating at least one side of the impregnated web with a chloride-containing synthetic polymer having a chloride content of at least about 8% on a solids basis, said chloride-containing synthetic polymer being formed primarily of monomers from the group consisting of vinyl chloride and vinylidene chloride.

2. The process of claim 1 in which the elastomeric chloride-free polymer comprises an acrylate copolymer formed of at least one polymerizable alpha-beta unsaturated carboxylic acid and at least one alkyl acrylate in which the alkyl group contains from one to four carbon atoms.

3. The process of claim 1 in which the elastomeric chloride-free polymer comprises a butadiene rubber.

4. The method of preparing a strong fire-resistant web which comprises impregnating a non-woven fibrous web consisting of a blend of about 40-70% cellulose fiber and about 60-30% non-cellulosic synthetic fibers with an aqueous suspension comprising the latex of an elastomeric polymer of acrylate esters in which is dispersed at least about 15% antimony trioxide based on the dry weight of the elastomeric polymer, curing the impregnated web at an elevated temperature, and subsequently coating the impregnated and cured web with a first coat comprised of an aqueous suspension of an ester plasticized vinyl chloride polymer, drying said coat and thereafter applying a second coat comprised of an aqueous suspension of a mixture of an ester plasticized vinyl chloride polymer and an unplasticized vinyl chloride polymer and drying said second coat.

5. A fire-resistant web comprising a non-woven fiber web structure consisting of a blend of cellulosic fibers and non-cellulosic synthetic fibers interiorly bonded with a substantially cured chloride-free elastomeric polymer containing antimony trioxide dispersed therethrough, said antimony trioxide being present in an amount of at least about 15% of the weight of the elastomeric polymer, said interiorly bonded web structure being exteriorly coated on at least one side thereof with a chloride-containing synthetic polymer formed primarily of monomers from the group consisting of vinyl chloride and vinylidene chloride, the chloride-containing coating being of a weight of at least about 10 lbs. per 3000 square feet of web, said coating having a chloride content of at least 8% on a solids basis.

References Cited in the file of this patent

UNITED STATES PATENTS

| | | |
|---|---|---|
| 1,885,870 | Snyder | Nov. 1, 1932 |
| 2,395,922 | Timmons | Mar. 5, 1946 |
| 2,520,103 | Loukomsky et al. | Aug. 22, 1950 |
| 2,640,000 | Seyb | May 26, 1953 |
| 2,658,880 | Landau | Nov. 10, 1953 |
| 2,707,157 | Stanton et al. | Apr. 26, 1955 |
| 2,795,524 | Rodman | June 11, 1957 |

OTHER REFERENCES

Little: Flame Proofing of Textile Fabrics, Reinhold Publishing Corp., 1947, pages 240, 241.

UNITED STATES PATENT OFFICE
CERTIFICATE OF CORRECTION

Patent No. 2,985,540                  May 23, 1961

Leroy J. Goldbeck

It is hereby certified that error appears in the above numbered patent requiring correction and that the said Letters Patent should read as corrected below.

Column 7, line 35, in the table, under the heading "Parts by Weight" first column therof, for "Wet" read -- Dry --.

Signed and sealed this 5th day of December 1961.

(SEAL)
Attest:

ERNEST W. SWIDER
Attesting Officer

DAVID L. LADD
Commissioner of Patents
USCOMM-DC